July 21, 1942.  W. T. B. ROBERTS  2,290,848
SHOE MACHINE
Filed March 10, 1942  8 Sheets-Sheet 4
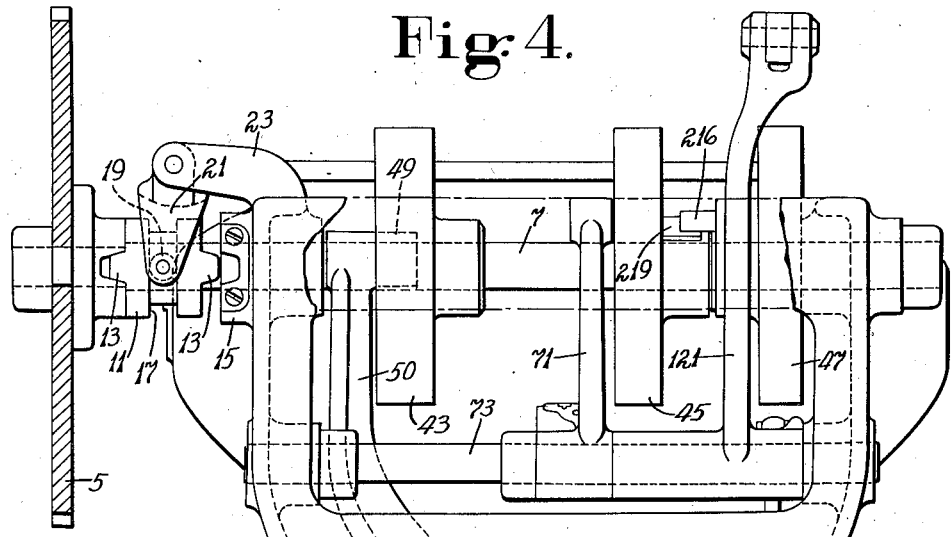
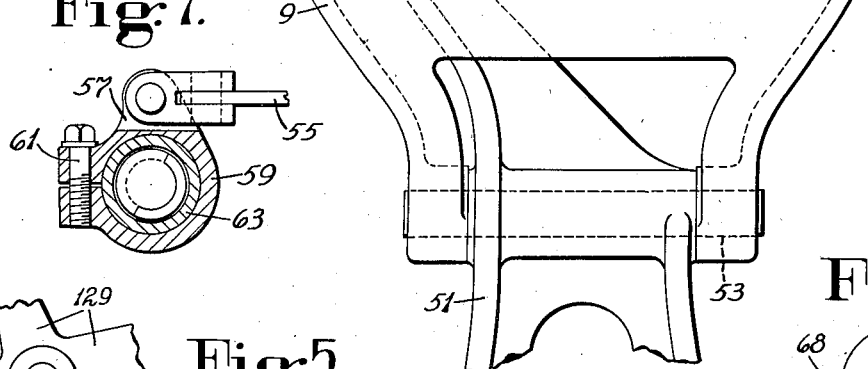
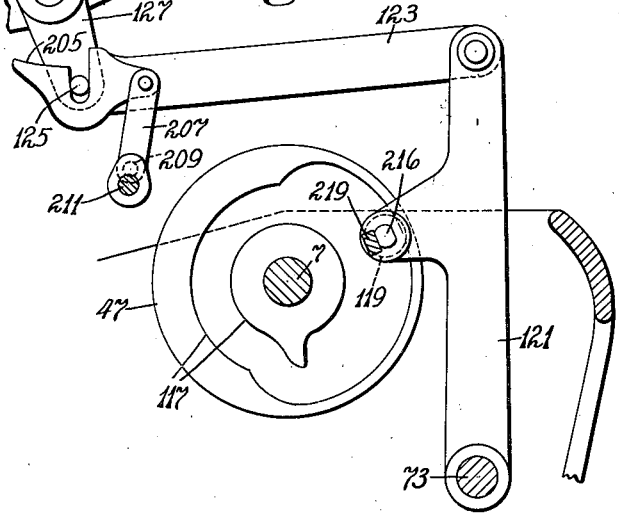
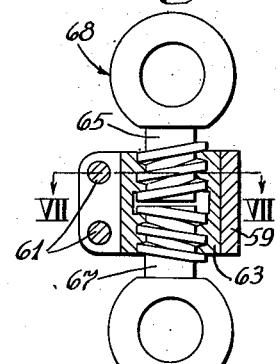
INVENTOR
William T.B. Roberts
By his attorney July 21, 1942.  W. T. B. ROBERTS  2,290,848
SHOE MACHINE
Filed March 10, 1942   8 Sheets-Sheet 5
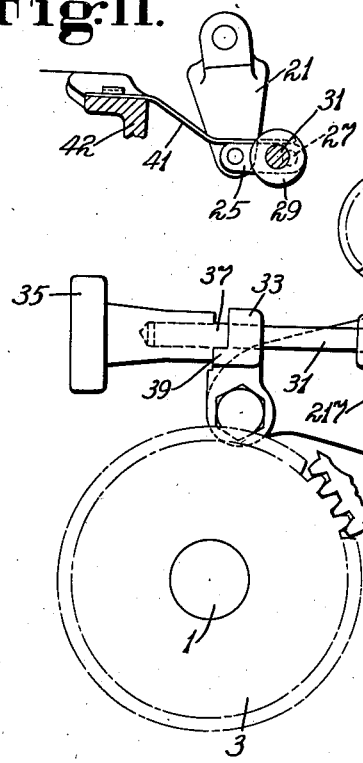
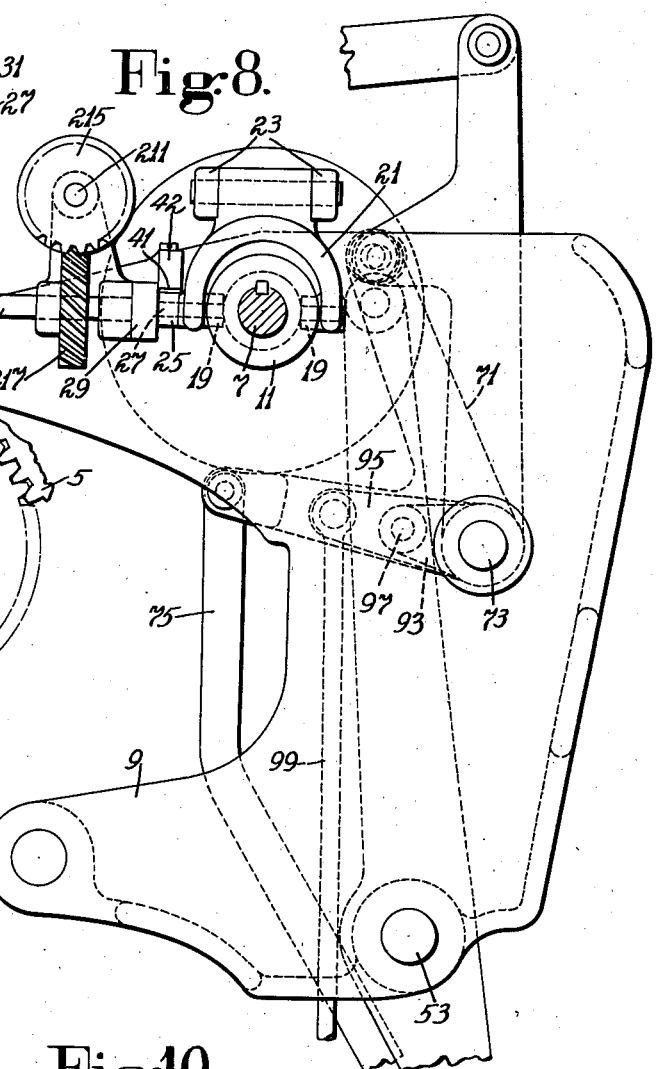
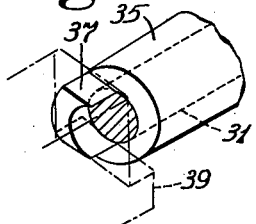
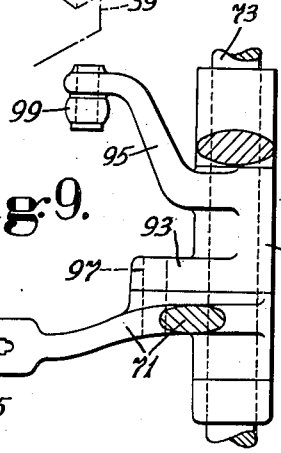
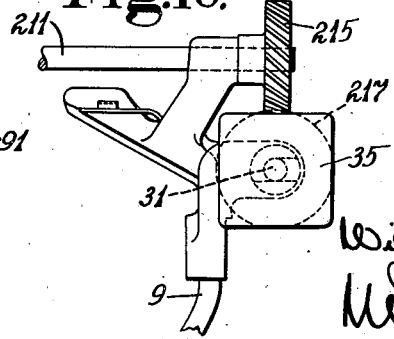

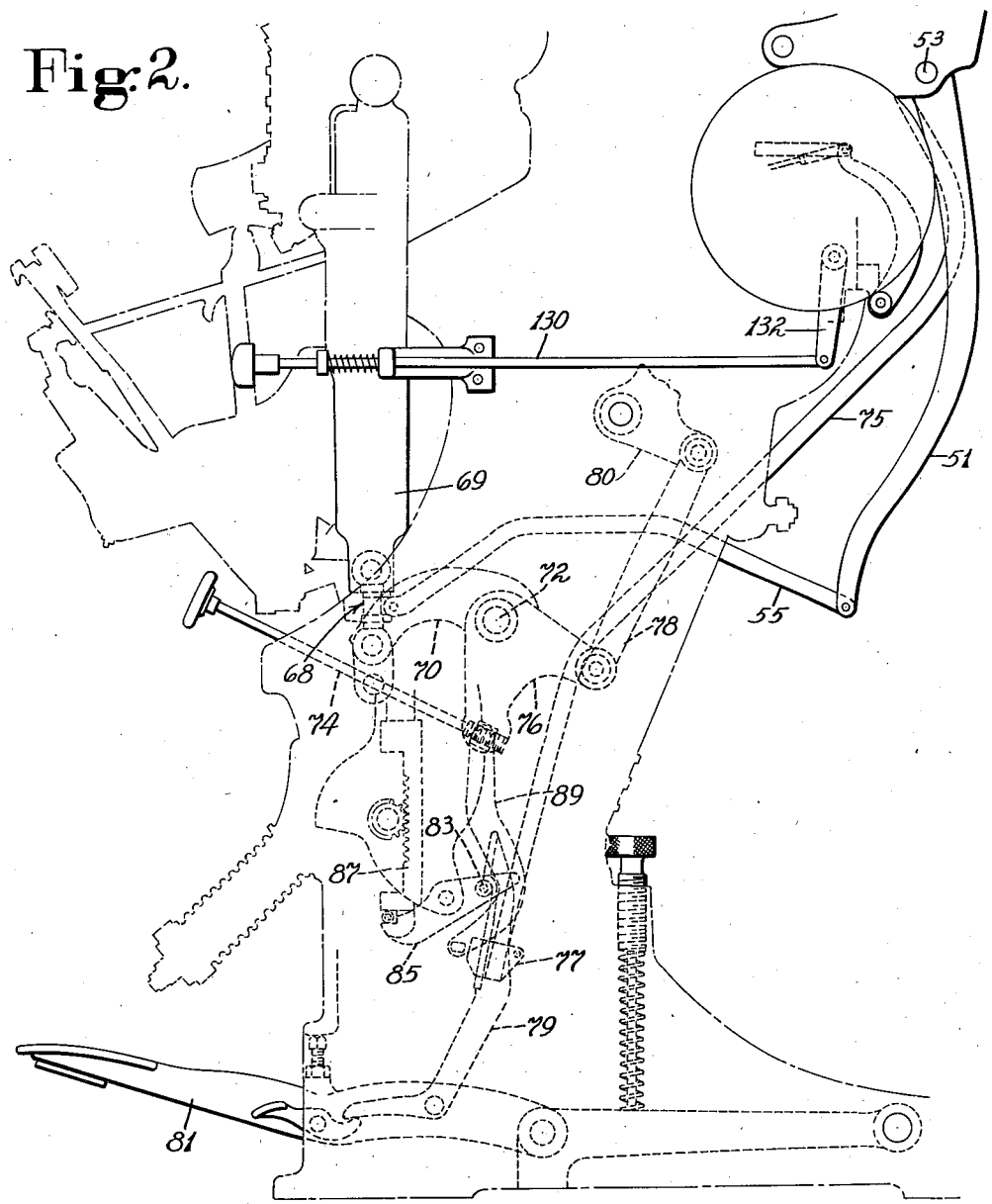

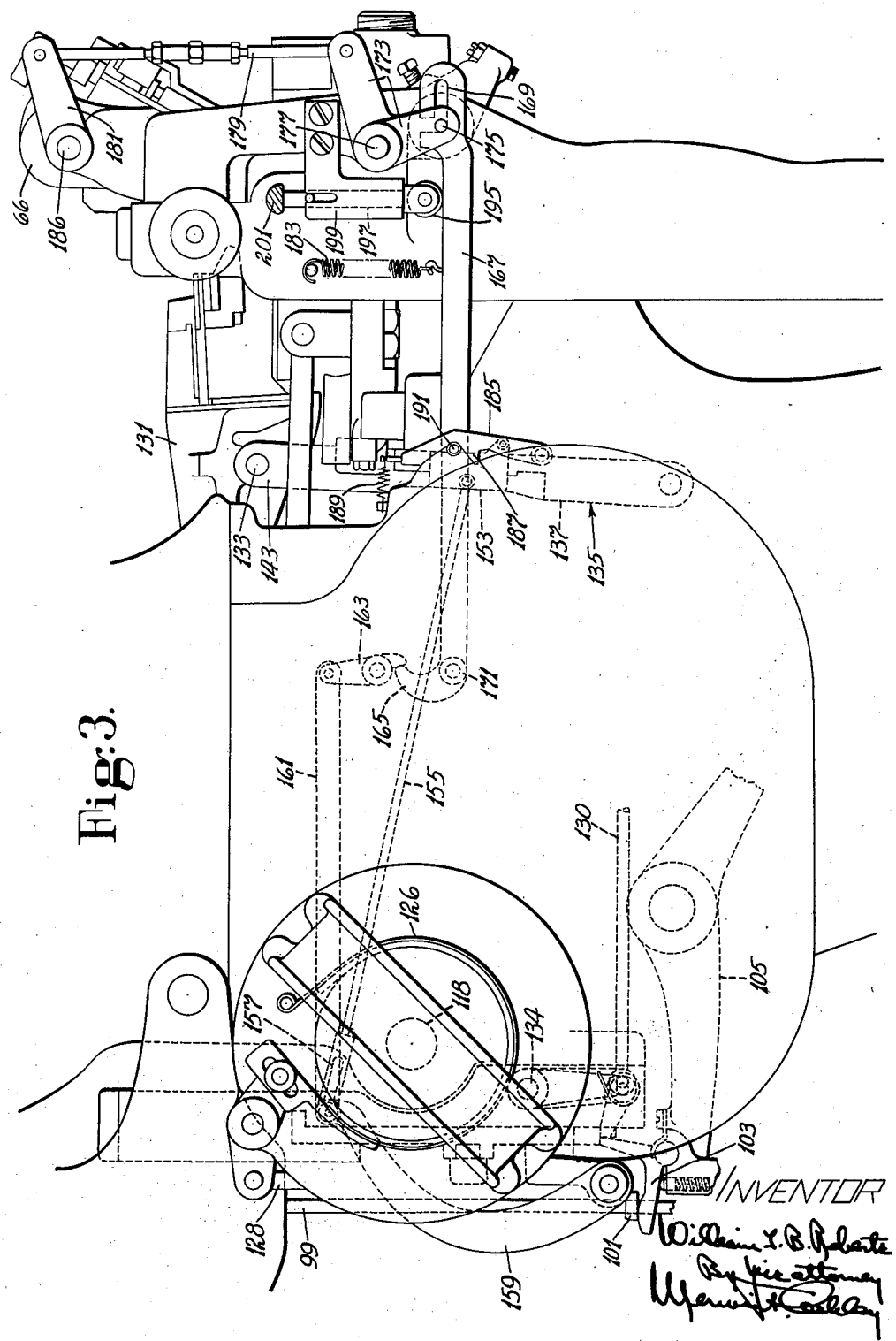

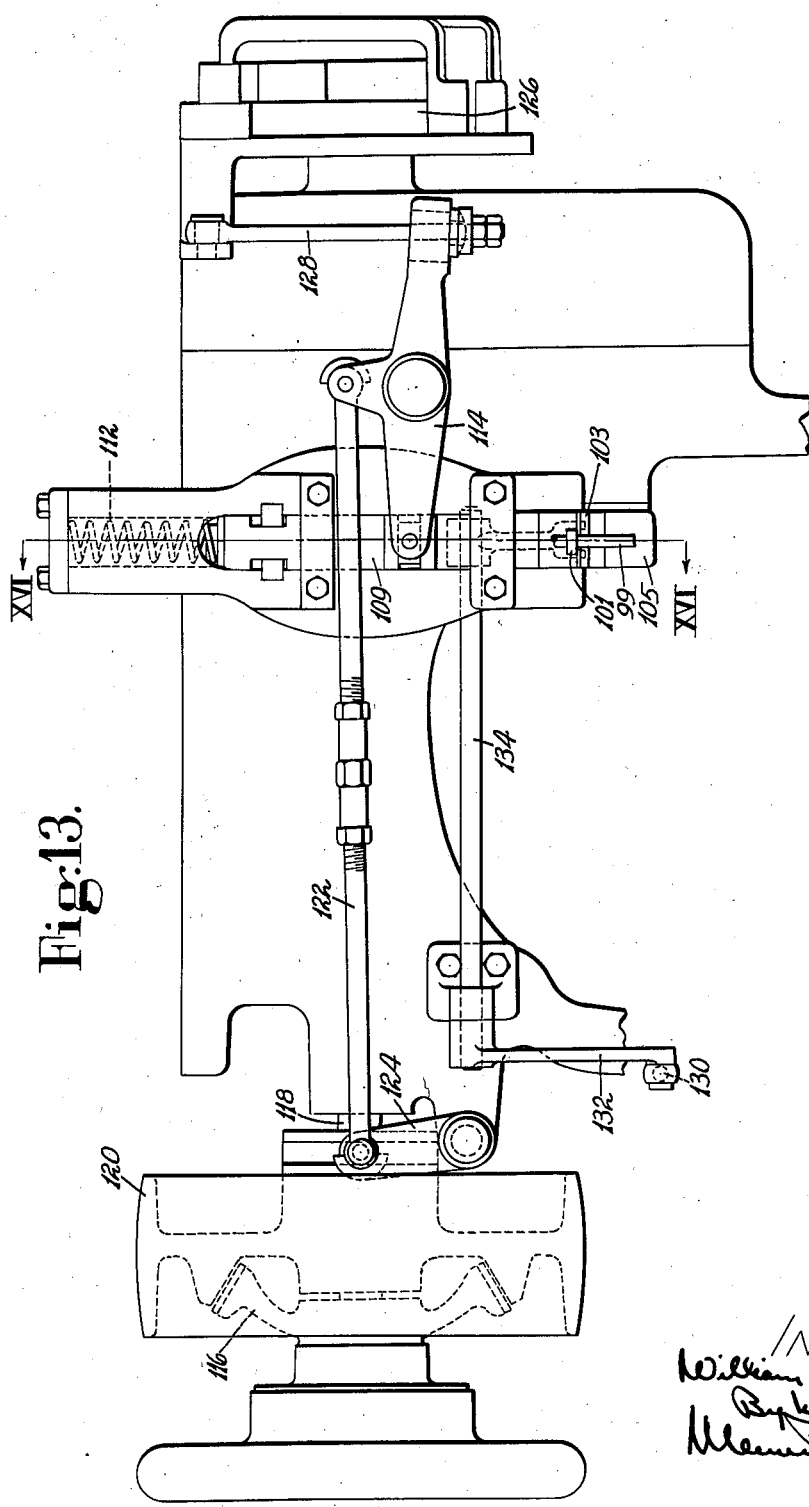

July 21, 1942.   W. T. B. ROBERTS   2,290,848
SHOE MACHINE
Filed March 10, 1942   8 Sheets-Sheet 7

July 21, 1942.  W. T. B. ROBERTS  2,290,848
SHOE MACHINE
Filed March 10, 1942  8 Sheets-Sheet 8

INVENTOR
William T. B. Roberts
By his attorney

Patented July 21, 1942

2,290,848

UNITED STATES PATENT OFFICE 2,290,848

SHOE MACHINE

William Thomas Buckingham Roberts, Leicester, England, assignor to United Shoe Machinery Corporation, Borough of Flemington, N. J., a corporation of New Jersey Application March 10, 1942, Serial No. 434,072
In Great Britain February 29, 1940

41 Claims. (Cl. 12—14)

This invention relates to machines for use in the manufacture of shoes and is herein illustrated as embodied in a modification of a machine for lasting the toe ends of shoes, which machine is generally similar in construction to the disclosure of United States Letters Patent No. 2,134,-148, granted on October 25, 1938, on an application of mine, although modified in certain respects as further disclosed, for example, in Letters Patent No. 2,140,652, granted on December 20, 1938, and No. 2,167,056, granted on July 25, 1939, on other applications of mine. It is to be understood, however, that the invention is not limited to machines of that particular character and that in some aspects, moreover, it is not limited to lasting machines.

A machine of the above-mentioned character is provided with wipers which, in a cycle of automatic power operations of the machine, are moved heightwise of a last to wipe the toe end of an upper toward the edge of an insole on the last and are thereafter operated to wipe the marginal portion of the upper inwardly over the insole. Associated with the wipers is upper-spreading means which is moved outwardly along the bottom face of the insole toward its edge to spread the margin of the upper over the wipers and which thereafter serves to clamp the margin of the upper on the wipers during a portion of the wiping operation. After the wipers have wiped the upper inwardly over the insole the machine comes automatically to a stop to permit the operator to inspect the work. When the machine is again started the wipers are partially retracted and are then moved inwardly again in wiping engagement with the upper. Thereafter a plurality of tackers are moved into operative positions and are operated to drive tacks to fasten the upper to the insole. The shoe is positioned relatively to the wipers and tackers by a holddown which engages the bottom of the forepart of the insole and against which the shoe is clamped by a toe rest moved into clamping position by a treadle prior to the starting of the machine. In the course of the cycle of operations automatic pawl-and-ratchet mechanism assumes yielding control of the toe rest to maintain it in operative position and to permit the operator to release the treadle. In the course of the cycle, moreover, the treadle is disconnected automatically from the toe rest to permit the latter to be returned to its initial position at the end of the cycle in case the operator still holds the treadle depressed.

Normally the action of the wipers in the manner above described is sufficient to conform the upper materials satisfactorily to the shape of the toe end of the last. Under some conditions, however, especially in operating on shoes having comparatively heavy upper materials, it has been found that better results are obtained in conforming the uppers to their lasts if they are subjected to a greater number of wiping operations before the fastenings are driven. It has sometimes been the practice, therefore, to subject such a shoe to two cycles of operations of the machine, mechanism including a hand lever being provided which the operator may, in that case, move into position to prevent separation and driving of tacks in the first cycle. It has been found, however, that if a substantial number of shoes in a run of work need to be thus operated upon by two cycles of operations, the output of the machine is seriously decreased. This is due mainly to the fact that the operator has to move the above-mentioned hand lever not only into position to prevent driving of tacks in the first cycle, but into position to permit them to be driven in the second cycle, the fact that the shoe is automatically released at the end of the first cycle, so that the operator must again insure that it is properly positioned and must move the toe rest once more into operative position by the treadle prior to the second cycle of operations, and the further fact that he has to start the machine to initiate the second cycle.

In view of the above and other considerations, the present invention, in one aspect, provides novel means whereby the machine may, at the will of the operator, be made to run automatically into a second cycle of operations without stopping at the end of the first cycle. For this purpose the construction shown comprises power-operated controlling mechanism arranged to be operated through a clutch, when this clutch has been properly set by the operator prior to the starting of the machine, to prevent the stopping of the machine at the end of a cycle. As illustrated, this controlling mechanism further prevents any stopping of the machine in the course of the first cycle, so that it runs continuously until it has arrived at the point in the second cycle where it normally comes to a stop to permit inspection of the work. The invention further provides power-operated mechanisms for modifying in certain respects the operation of the machine when it runs through two cycles. One of these mechanisms prevents disconnection of the treadle from the toe rest in the first cycle, so that by holding the treadle depressed the operator may maintain the shoe in the proper position at the end of that cycle and until the machine resumes automatic control of the toe rest in the second cycle. Another of the mechanisms lifts the holddown slightly near the end of the first cycle to cause the shoe to be correspondingly lifted through the toe rest so as to increase the pressure applied by the wipers to the upper in the second cycle. Still another power-operated mechanism acts through the previously mentioned hand-operated mechanism to prevent driving of tacks in the first cycle but to permit them to be driven in the second cycle. The construction shown is further such that when the machine has come to a stop for inspection of the work in the second cycle, the operator may, if desired, use the hand-operated mechanism to prevent the driving of tacks also in that cycle. When the machine is set to perform a single cycle of operations this hand-operated mechanism is disconnected from the power means for operating it in the manner above described, and the construction disclosed is also such that the machine cannot be set to perform two cycles of operations if the hand-operated mechanism is in position to prevent driving of tacks.

Whether a shoe has been operated upon by one cycle or by two cycles of operations of the machine, it may occasionally happen, because of faulty tack heads, failure of the tack-separating devices to deliver the proper number of tacks or such improper positioning of the shoe in the machine as to cause improper positioning of tacks in the shoe, that it is necessary to present the shoe to the machine for a further cycle of operations to receive another set of tacks. When a shoe having comparatively heavy upper materials is thus presented to receive a second set of tacks, there may be danger of damage to the machine by engagement of the previously mentioned upper-spreading means with the tacked-down margin of the upper materials. The invention accordingly further provides mechanism which is movable at the will of the operator to prevent objectionable interference between the upper-spreading means and the margin of the upper during a cycle of operations of the machine. In a machine of the character illustrated the upper-spreading means is normally moved heightwise of the shoe into close relation to the bottom of the insole through power-operated links, and for the purpose in view these links in the construction shown are formed of parts which are normally connected together but are arranged to be disconnected at the will of the operator, whereupon springs effect such relative movements of the parts of the links as to position the upper-spreading means at an abnormal distance from the bottom of the shoe as it is moved outwardly along the insole. Thereafter the upper-spreading means is returned automatically to its normal position and the parts of the links are again connected together. A machine of the character illustrated also includes a holddown member which is movable automatically heightwise of the shoe into engagement with the margin of the toe end of the insole in the cycle of operations; and further to avoid danger of damage to the machine by engagement of this member with the margin of the upper over the insole if a shoe is presented to receive a second set of tacks, the invention provides means for also rendering this member inoperative at the will of the operator during a cycle of operations.

The above and other features of the invention, including various novel details of construction and combinations of parts, will now be more particularly described with reference to the accompanying drawings and thereafter pointed out in the claims.

In the drawings,

Fig. 2 is a similar view of the lower portion of the machine;

Fig. 3 shows the upper portion of the machine in left-hand side elevation;

Fig. 4 is a view of certain parts in rear elevation;

Fig. 5 is a detail view mainly in right-hand side elevation, showing mechanism provided for controlling the driving of the tacks;

Fig. 6 is a view partly in elevation and partly in section, showing a portion of mechanism included in the machine for controlling the holddown;

Fig. 7 is a view mainly in section on the line VII—VII of Fig. 6;

Fig. 8 is a view mainly in right-hand side elevation of the portion of the machine shown in Fig. 4 and of parts associated therewith;

Fig. 9 is mainly a plan view of certain parts shown in Fig. 8;

Fig. 10 is a view in front elevation of a portion of the structure shown in Fig. 8;

Fig. 11 is a detail view mainly in front elevation of parts shown in Fig. 8;

Fig. 12 is a detail view in perspective also of a portion of the structure shown in Fig. 8;

Fig. 13 is a view in rear elevation showing a clutch through which the machine is operated and controlling mechanism associated therewith;

Figure 1:
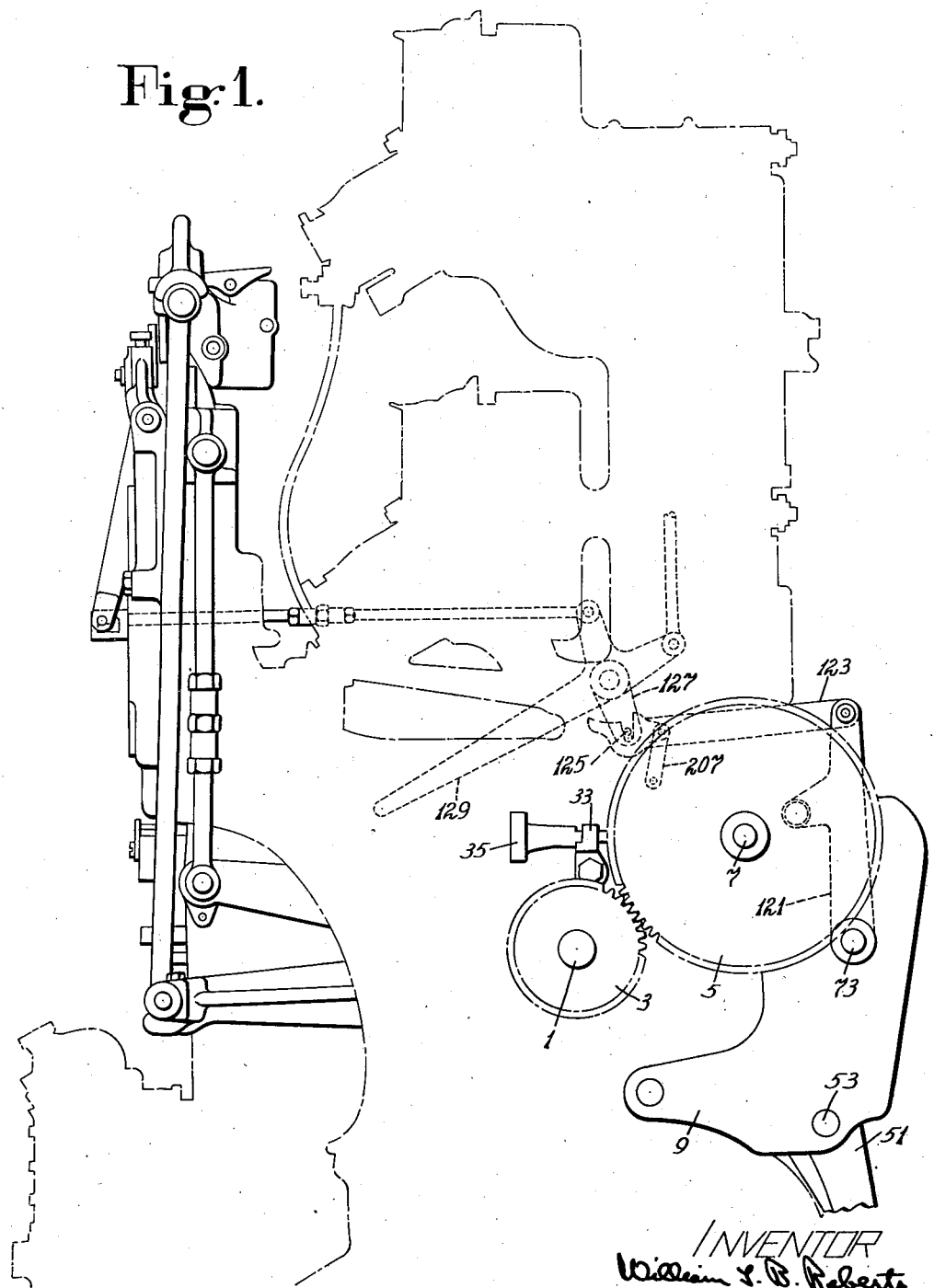
Fig. 1 is a view in right-hand side elevation of the upper portion of the machine in which the invention is herein illustrated as embodied, the outline of parts of the structure being indicated diagrammatically.

In view of the disclosures in the previously mentioned Letters Patent the construction of the machine will be herein described only in so far as is necessary for an understanding of the present invention. The machine is provided as heretofore with a main cam shaft 1 having thereon cams for operating various instrumentalities, this cam shaft corresponding to the cam shaft 101 shown in Letters Patent No. 2,134,148. For purposes of this invention there is secured to the right-hand end of this cam shaft a gear 3 which is in mesh with a gear 5 loosely mounted on a shaft 7 journaled in bearings on a bracket 9 secured to the frame of the machine. The ratio of the gears 3 and 5 is such that for two complete revolutions of the shaft 1 the shaft 7 makes only one revolution when this shaft is connected to the gear 5. For making this connection there is provided a clutch member 11 (Figs. 4 and 8) splined on the shaft 7 and having at its opposite ends teeth 13 arranged respectively to enter a recess in a hub portion of the gear 5 or a recess in a boss 15 formed on the bracket 9. Lying in opposite sides of a groove 17 in the clutch member 11 are small rolls 19 mounted on the two arms of a yoke member 21 which is pivotally mounted on an arm 23 of the bracket 9. To one of the arms of the yoke member 21 is pivotally connected the left-hand end of a small link 25 (Fig. 11) the right-hand end of which is connected to an eccentric pin 27 extending rearwardly from a disk 29 fast on the rear end of a forwardly extending rod 31. Near its front end this rod is journaled in an arm 33 which is bolted to the bracket 9, and forwardly of this arm the rod is provided with a hand knob 35 for turning it. By turning the rod through 180° the yoke member 21 may be swung to cause one of the teeth 13 to move out of the recess in the boss 15 and the other of the teeth to move into the recess in the hub of the gear 5 to provide a driving connection between this gear and the shaft 7. To limit turning movement of the rod 31 in each direction there is formed on the rear end of the knob 35 a small abutment 37 (Figs. 8 and 12) arranged to engage a forwardly extending lug 39 on the arm 33, and to insure that the abutment will be moved into engagement with the lug if the operator should fail to complete the turning movement of the rod 31 there is provided a leaf spring 41 arranged to bear on the upper surface of the link 25, as shown in Fig. 11, one end of this spring being fast on a lug 42 projecting from the bracket 9.

Figures 17, 18:
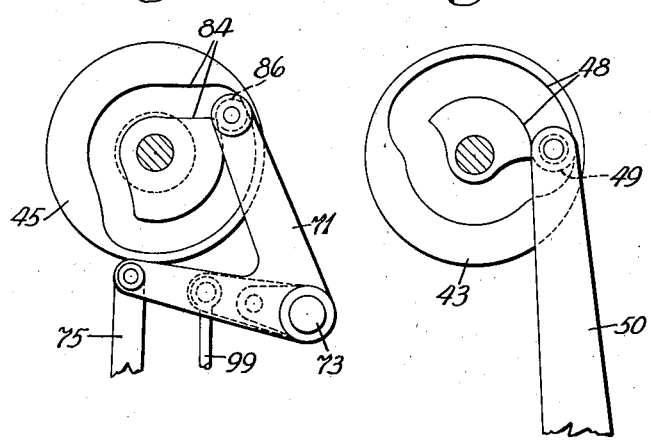
Figs. 17 and 18 are views in right-hand side elevation of certain cams with which the machine is provided and of parts operated by these cams.

Fast on the shaft 7 (Fig. 4) are three cams 43, 45 and 47. Lying in a cam track 48 (Fig. 18) in one side of the cam 43 is a roll 49 mounted on the upper end of an upwardly extending arm 50 of a lever 51 which is pivotally mounted on a shaft 53 supported in the lower portion of the bracket 9. To each side of the lower end of the lever 51, which is bifurcated, is pivotally connected the rear end of a forwardly extending link 55 (Fig. 2), only one of these links being visible in the drawings. At its front end each link 55 is pivotally connected to a short arm 57 (Fig. 7) of a split sleeve 59 (see also Fig. 6) which is clamped by screws 61 to an internally threaded bushing 63. Threaded respectively into the upper and lower ends of this bushing are members 65 and 67 provided respectively with right and left threads. The bushing 63 and the two members 65 and 67 thus constitute a link 68, there being two of these links corresponding in function to the links 137 disclosed in Letters Patent No. 2,134,148. That is, the two links 68 serve as connections between two vertically movable slides 69 (Figs. 2 and 14) and forwardly extending arms of a lever 70 which is mounted to swing about a rod 72 and is adjustably connected through a threaded rod 74 to a bell-crank lever 76 also mounted to swing about the rod 72, this bell-crank lever being connected by a link 78 to a lever 80 operated by a cam (not shown) on the cam shaft 1. These parts are substantially like corresponding parts shown in Fig. 4 of Letters Patent No. 2,134,148. The two vertically movable slides 69 support by means of a crosshead 66 a holddown 82 (Figs. 14 and 15) arranged to engage the bottom of the forepart of the insole of the shoe and in response to downward movement of the slides 69, effected by the above-described mechanism, to impart a short downward movement to the shoe at a predetermined time in the cycle of operations of the machine, as disclosed in the last-mentioned Letters Patent. The additional purpose and function of the new links 68 and of the mechanism connected to their threaded bushings 63 will be hereinafter explained.

Lying in a cam track 84 (Fig. 17) in one side of the cam 45 is a roll 86 mounted on an upwardly extending arm of a bell-crank lever 71 which is mounted to swing about a shaft 73 (Figs. 4 and 8) supported by the bracket 9. To the front end of a forwardly extending arm of the bell-crank lever 71 is pivotally connected the upper end of a downwardly and forwardly extending bar 75 (Fig. 2). Fast on the lower end of this bar is a block 77 arranged loosely to straddle an upwardly extending link 79 which is pivotally mounted on a treadle 81 with which the machine is provided as heretofore, the link 79 corresponding to the link 377 shown in Letters Patent No. 2,134,148. The link 79 is provided, as heretofore, with a shoulder arranged to engage a roll 83 on the rear end of a lever 85 the front end of which underlies the lower end of a rack bar 87 whereby, in response to depression of the treadle 81, a toe rest 88 (Fig. 15) is moved upwardly to clamp the forepart of the shoe against the holddown 82. The shoe-supporting means is preferably constructed as disclosed in the previously mentioned Letters Patent No. 2,167,056, so that the toe rest 88 in its upward movement is carried into engagement with the shoe previously presented by the operator in contact with the holddown 82. It is to be understood that the machine is provided, also as heretofore, with pawl-and-ratchet mechanism (not herein shown) which early in the cycle of power operations of the machine assumes yielding control of the toe rest to maintain it in clamping relation to the shoe while permitting it to receive a short downward movement with the shoe effected by the holddown 82, as above suggested, at a predetermined time in the cycle, and which near the end of the cycle releases the toe rest for downward movement to its initial position. To permit the toe rest thus to be moved downwardly near the end of the cycle even if the operator should hold the treadle 81 depressed, there is provided a releasing lever 89 which forms an extension of one arm of the previously mentioned bell-crank lever 76 and corresponds to the lever 378 shown in Letters Patent No. 2,134,148. The lever 89 acts early in the cycle of operations to swing the link 79 rearwardly from over the roll 83 and for this purpose is provided, in the construction herein shown, with means for engaging the previously mentioned block 77. The purpose of the cam-operated bar 75 is to impart to the block 77, when the machine is set to perform two cycles of operations, such downward movement in the first cycle as to prevent the lever 89 from swinging the link 79 rearwardly from over the roll 83, so that the operator by holding the treadle depressed may maintain the toe rest in clamping relation to the shoe until after the beginning of the second cycle of operations, notwithstanding the automatic release of the toe rest by the pawl-and-ratchet mechanism near the end of the first cycle, as further hereinafter explained.

Figure 16:
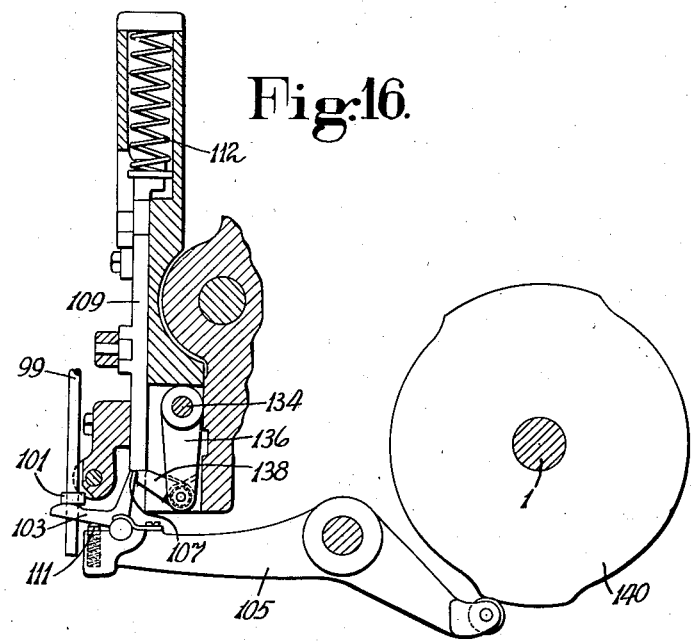
Fig. 16 is mainly a section on the line XVI—XVI of Fig. 13.

Loosely mounted on the shaft 73 is a lever 91 (Fig. 9) having two forwardly extending arms 93 and 95. The arm 93 is connected by a pin 97 to the above-mentioned bell-crank lever 71, and the arm 95 has pivotally connected thereto the upper end of a downwardly extending rod 99. This rod is provided for automatically controlling a clutch through which the machine is operated, to cause the machine to begin a second cycle of operations after the first cycle. For this purpose the rod has secured thereon a collar 101 (Figs. 3, 13 and 16) arranged to engage the upper face of a rearwardly extending arm of a pawl 103 pivotally mounted on a lever 105. An upwardly extending arm of this pawl is arranged normally to engage the lower end face 107 (Fig. 16) of a vertically movable slide 109, the pawl being yieldingly maintained in this position by a spring-pressed pin 111. The slide 109 is controlled by a spring 112 which moves it downwardly when it is released by the pawl 103. Connected to the slide is one arm of a three-armed lever 114 (Fig. 13) which is swung in a counter-clockwise direction, as viewed in that figure, by the downward movement of the slide. The clutch is a cone clutch and comprises a member 116 fast on a driving shaft 118 and a pulley 120 movable along the shaft into or out of driving engagement with the member 116. When the three-armed lever 114 is operated as above described it acts through a rod 122 and a swinging yoke member 124 to move the pulley into engagement with the member 116 and thus to start the operation of the machine. Simultaneously the lever 114 serves to release a brake 126 which it controls through a rod 128. Release of the slide 109 by the pawl 103 to cause the clutch to be actuated as above described is effected by the operator by rearward movement of a push rod 130 (Fig. 2) connected at its rear end to an arm 132 fast on a rockshaft 134 (Fig. 13), this rockshaft having also fast thereon another arm 136 (Fig. 16) carrying a spring-controlled pawl 138 arranged to underlie the lower end of the slide 109 and to engage the upwardly extending arm of the pawl 103. Accordingly, rearward movement of the push rod 130 causes the pawl 138 to swing the holding pawl 103 from under the slide 109, the pawl 138 then yielding in a downward direction to permit the downward movement of the slide. The lever 105 which carries the pawl 103 is controlled by a cam 140 on the cam shaft 1, this cam being so formed that immediately after the starting of the machine it permits the lever 105 to be swung in the direction to lower the pawl 103 until the pawl is again moved inwardly under the shoulder 107 by the pin 111. Thereafter, at the proper time the cam 140 swings the lever 105 to raise the slide 109 and thereby to disconnect the clutch and apply the brake. It will be noted that the cam 140 is so shaped that it thus normally stops the operation of the machine between the beginning and the end of the cycle as well as at the end of the cycle, as more particularly hereinafter explained. The cam-controlled rod 99 provided by the present invention serves to control the pawl 103 in such manner as to prevent normal stopping of the machine by the cam 140 until after the beginning of a second cycle of operations when it is desired that the machine shall perform two cycles of operations, as also more fully hereinafter explained.

The third cam 47 on the shaft 7 has therein a cam track 117 (Fig. 5) in which lies a roll 119 carried by a lever 121 which is mounted at its lower end on the shaft 73. To the upper end of the lever 121 is pivotally connected the rear end of a link 123 the front end portion of which is slotted to receive a pin 125 on a downwardly extending arm 127 formed on a hand lever 129 (Fig. 1) which corresponds to the hand lever 391 shown in Letters Patent No. 2,134,148. As therein fully disclosed, upward movement of the front end of this hand lever serves to prevent separation and driving of tacks and enables the operator, after the machine has come automatically to a stop at a time in the cycle before the normal driving of the tacks by a group of tackers 113 (Fig. 15), to prevent them from being driven during the remainder of the cycle, so that the upper may be subjected to a further wiping operation in another cycle of operations of the machine before it is fastened in lasted position. It will be understood that the cam-operated lever 121 and link 123 are provided for so operating the hand lever 129 as to prevent automatically the driving of tacks in the first cycle of operations of the machine if the machine is set to perform two cycles of operations.

Figure 15:
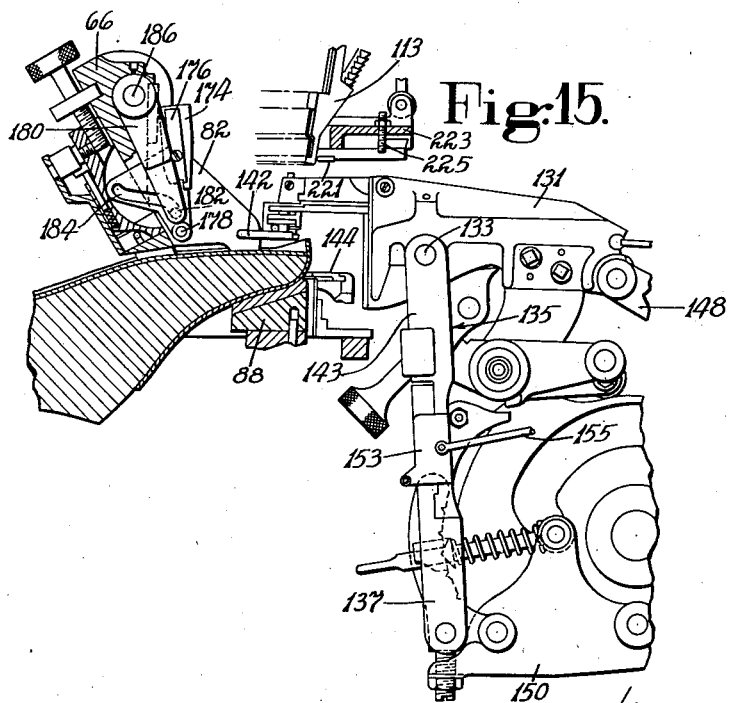
Fig. 15 is a view partly in section and partly in right-hand side elevation, showing instrumentalities which act directly on the shoe as they appear prior to the starting of the power operation of the machine.
Figure 19:
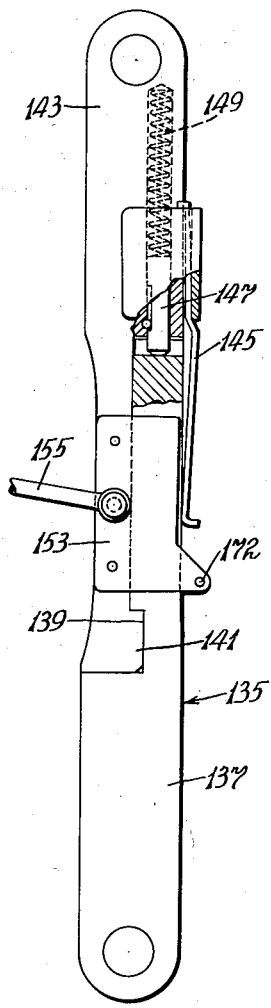
Fig. 19 is a detail view mainly in left-hand side elevation of a portion of the structure shown in Fig. 15.

The machine is further provided with upper-spreading fingers 142 (Fig. 15), corresponding to the fingers 149 of Letters Patent No. 2,134,148, the purpose of which is to spread the margin of the upper outwardly from over the insole and thereafter to act as retarders by clamping the margin of the upper on toe-lasting wipers 144 during a portion of the operation of these wipers on the upper. The wipers 144 are moved upwardly from the position in which they are shown in Fig. 15 to wipe the upper heightwise of the last and are thereafter moved inwardly to wipe the margin of the upper over the insole prior to the driving of the upper-fastening tacks. The fingers 142 are supported on the front end of a rearwardly extending bar 131 (corresponding to the bar 153 of the last-mentioned Letters Patent) whereby the fingers are moved downwardly toward the insole and are then moved rearwardly lengthwise of the shoe toward the edge of the insole, the fingers also being swung apart in the course of their rearward movement as fully disclosed in said Letters Patent. The bar 131 is mounted at its rear end for downward and upward swinging movements on a cam-operated lever 148 by which the bar is moved in directions lengthwise of the shoe, the upper end portion only of this lever being visible in Fig. 15. Forwardly of its rear end the bar 131 is connected by a pin 133 to the upper ends of a pair of links 135, these links corresponding to the links 169 shown in the last-mentioned Letters Patent. The lower ends of these links are connected to a cam-operated lever 150 whereby, through the links, downward and upward swinging movements are imparted to the bar 131. As herein illustrated the links 135, unlike the corresponding links heretofore used, are not unitary members but are so constructed that their effective lengths may be varied. For this purpose each link, as shown particularly in Fig. 19, includes an upwardly extending member 137 connected at its lower end to the lever 150, this member being provided substantially midway of its length with a slot 139 in its rear side. Extending into this slot is a projection 141 formed on the lower end of a downwardly extending member 143 which is connected at its upper end to the bar 131. The members 137 and 143 are held in interlocked relation by a leaf spring 145 which is secured to the front portion of the member 143 and extends downwardly into engagement with the front face of the member 137. A pin 147 mounted in a vertical bore in the member 143 and pressed downwardly by a spring 149 bears at its lower end against the upper end of the member 137, so that the spring 149 tends to separate the two members. It will be evident that if the member 143 is swung far enough rearwardly to withdraw its projection 141 from the slot 139, the connection between the two members will be broken and the spring 149 will be free to effect relative lengthwise movement of the members. Actually the spring will then impart upward movement to the member 143, by reason of the connection of the member 137 to the lever 150. In this manner the effective lengths of the two links 135 will be increased and the bar 131 will be swung upwardly to such a position that the upper-spreading fingers 142, notwithstanding the downward swinging movement of the lever 150, will be spaced at such a distance above the shoe that they will operate idly without engaging the shoe in a cycle of operations of the machine. The purpose of this is to prevent objectionable interference between the fingers and the tacked-down margin of an upper if a shoe, after the lasting of its toe end, is presented to the machine to receive a second set of tacks.

For moving the members 143 of the links 135 rearwardly to disconnect them from the members 137 as above described, each member 143 has secured to it a U-shaped clip 153. To each clip is pivotally connected the front end of a rearwardly extending rod 155 having at its rear end a pin-and-slot connection 157 (Fig. 3) with the upper end of a lever 159 pivotally mounted at its lower end on the frame of the machine. Also connected to the upper end of the lever 159 is the rear end of a forwardly extending rod 161 the front end of which is pivotally connected to the upper end of a small lever 163 pivoted between its ends on the frame. The lower end of the lever 163 is arranged to be engaged on its rear side by an upwardly extending curved finger 165 formed on the rear end of a forwardly extending rod 167, this rod corresponding to the rod 344 shown in Letters Patent No. 2,134,148. The rod 167 is provided at its front end, for a purpose which will be presently explained, with an L-shaped slot 169 having a horizontal portion and a vertical portion, the vertical portion being open at its upper end. This rod is moved rearwardly and forwardly, as heretofore, by a cam (not shown) engaging a cam roll 171 on the rear end of the rod. The rod may be swung downwardly by the operator about the axis of the cam roll, and by such movement of the rod the lever 163 is operated by the finger 165 to impart rearward movement to the rod 161 and the lever 159 and thereby to disconnect the members 143 of the links 135 from the members 137. In this operation any undue rearward movements of the members 143 relatively to the members 137 are prevented by engagement of studs 172 (Fig. 19) on the U-shaped clips 153 with the front faces of the members 137.

The machine is further provided with an insole-engaging holddown plate 174 (Fig. 15), corresponding to the plate 217 shown in the last-mentioned Letters Patent, for engaging the marginal portion of the toe end of the insole to press it down on the last until the wipers begin to wipe the upper inwardly over the insole. This plate is carried by an arm 176 pivotally mounted at 178 on the holddown 82 for downward and upward swinging movements and is swung downwardly and upwardly by another arm 180 provided with a roll 182 lying in a slot 184 of the arm 176. The arm 180 is fast on a shaft 186 rotatable in the previously mentioned crosshead 66 which carries the holddown 82. Normally the shaft 186 is rotated to swing the plate 174 from its initial position (Fig. 15) downwardly into engagement with the insole by rearward movement of the above-mentioned rod 167 (Fig. 3) effected by the cam which operates the rod. For this purpose the rod is arranged to impart swinging movement to a bell-crank lever 173 by engaging a pin 175 mounted on one arm of this lever when the pin is located in the upwardly extending portion of the L-shaped slot 169. The bell-crank lever 173 is mounted to swing about a pin 177 on a depending portion of the crosshead 66, and a forwardly extending arm of the lever is connected by a rod 179 to a lever 181 fast on the shaft 186. Connected to the rod 167 is a spring 183 which tends to swing it upwardly and holds it normally in a position in which the pin 175 is in the plane of the horizontal portion of the L-shaped slot 169, as shown in Fig. 3. Since the vertical portion of this slot is open, the pin 175 does not prevent the operator from swinging the rod 167 downwardly to render the upper-spreading fingers 142 ineffective during a cycle of operations of the machine, as previously described. It will be evident that after the rod has thus been swung downwardy and while it is maintained in that position, movements of the rod by its operating cam in a cycle of operations of the machine are ineffective to impart any movement to the holddown plate 174 and accordingly this plate remains in its initial position to prevent any danger of damage to the machine by engagement of the plate with the margin of an upper previously wiped over the insole and fastened thereto.

In order to relieve the operator of the necessity of holding the rod 167 against return movement after swinging it downwardly, there is provided a latch arm 185 pivotally mounted at its lower end on the frame and having thereon a rearwardly extending lug 187. A small spring 189 tends to swing the arm 185 in a rearward direction and holds it normally in contact with an abutment 191 extending from the rod 167. When the rod is swung downwardly the abutment 191 is carried past the lug 187 and then engages the lower face of the lug to prevent the rod from swinging upwardly again. Return upward movement of the rod 167 results from a rearward movement imparted to the rod by its cam in the course of the cycle of operations, whereby the abutment 191 is carried from under the lug 187, rearward movement of the arm 185 being limited by a stop (not shown). It will be understood that when the rod is thus released the spring 183 swings it upwardly into engagement with the pin 175 forwardly of the vertical portion of the L-shaped slot 169, and thereafter a forward movement imparted to the rod by its cam brings it again into position for the pin to enter that portion of the slot.

Figure 14:
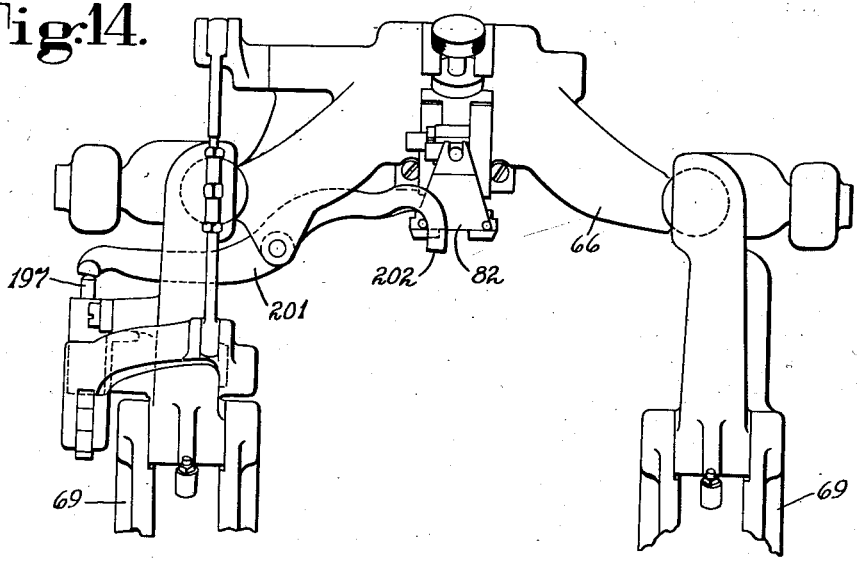
Fig. 14 is a view in front elevation of portions of the structure shown in Fig. 3.

Reference has been made above to the fact that normally the rod 167 is in such a position that the pin 175 is in the plane of the horizontal portion of the L-shaped slot 169. This relation of the parts is maintained if the machine is operated in the absence of any shoe, and accordingly under those conditions the rod 167 is ineffective to impart any movement to the holddown plate 174 and the plate remains in its initial position. It is only in consequence of such a short downward swinging movement of the rod 167 as to position the pin 175 in the vertical portion of the L-shaped slot 169 that the rod is thereafter effective to impart downward swinging movement to the holddown plate. For this purpose a roll 195 is arranged to engage the upper face of the rod, this roll being mounted on the lower end of a pin 197 vertically movable in a boss formed on a bracket 199 fast on that portion of the crosshead 66 on which the bell-crank lever 173 is supported. The upper end of the pin 197 bears against the lower face of the left-hand end of a lever 201 which is pivotally mounted between its ends on the crosshead 66 as shown in Fig. 14. The right-hand arm of the lever 201 has a downwardly extending end 202 arranged to be engaged by the bottom of the forepart of a shoe when the shoe is presented to the machine and to be swung upwardly as the shoe is positioned against the holddown 82. In this manner downward movement is imparted to the pin 197 to position the arm 167 at such a height that it will be thereafter effective to operate the holddown plate 174.

From the foregoing description it will be understood that in the operation of the machine on a shoe having upper materials of comparatively light weight the hand knob 35 (Fig. 8) will occupy such a position that the shaft 7 is disconnected from the gear 5 and accordingly, when the machine is started, it will perform a single cycle of operations on the shoe in the same manner as heretofore, releasing the shoe for removal from the machine at the end of the cycle. If, however, the upper materials are so heavy that it appears desirable to subject the shoe to two cycles of operations of the machine, the knob 35 will be turned by the operator through 180° to connect the shaft 7 to the gear 5, as illustrated in Fig. 4, so that when the machine is operated the cams 43, 45 and 47 will be rotated. To start the operation of the machine the push rod 130 (Fig. 2) is moved rearwardly, thereby moving the pawl 103 (Fig. 16) from under the slide 109, so that this slide is moved downwardly by the spring 112 to cause the clutch members 116, 120 (Fig. 13) to engage each other and to release the brake. In a normal cycle of operations, in which the wipers are preferably operated as described in the previously mentioned Letters Patent No. 2,140,652, the machine is brought automatically to a stop after the wipers have received their first inward movement to wipe the margin of the upper over the insole, so as to enable the operator to inspect the work at that stage of the lasting operation. This automatic stopping of the machine is effected by the action of the cam 140 (Fig. 16) on the lever 105 to cause the pawl 103 to lift the slide 109 after the pawl has returned to a position under the slide. When, however, the machine is set, as above described, to perform two cycles of operations, the cam 45 moves the rod 99 downwardy at the proper time to cause the collar 101 on the rod to prevent the return of the pawl 103 to a position under the slide 109. Accordingly, the lever 105 is rendered ineffective to stop the machine between the beginning and the end of the first cycle of operations, and by reason of the shape of the cam 45 the lever is also ineffective to stop the machine at the end of the first cycle and therefore the machine, without stopping, immediately begins the second cycle of operations. Prior to the time in the second cycle when the cam 140 would normally stop the machine the collar 101 is lifted by the rod 99, thus permitting the pawl 103 to return to a position under the slide 109, so that when the lever 105 is moved in a clockwise direction (Fig. 16) by the cam 140 the slide is lifted and the machine is brought to a stop at the time in the cycle when the wipers have completed their first inward wiping movement. Thereafter, following another starting of the machine by movement of the push rod 130, the cam 140 brings the machine to a stop in the usual manner at the end of the second cycle of operations.

The cam 45 also causes the bar 75 (Fig. 2) to be moved downward early in the first cycle of operations to carry the block 77 out of the path of movement of the treadle-releasing lever 89, so that when this lever is operated in the first cycle it will have no effect on the link 79. The operator, therefore, by continuing to hold the treadle 81 depressed, maintains the toe rest 88 (Fig. 15) in shoe-clamping position after the toe rest is disconnected automatically near the end of the first cycle from the automatic pawl-and-ratchet mechanism which controls it. In the course of the second cycle of operations the bar 75 is moved upwardly to return the block 77 to a position in the path of movement of the lever 89, so that when this lever is operated in that cycle it acts in the normal manner on the link 79 to disconnect the treadle from the lever 85. The toe rest, therefore, upon its release by the automatic pawl-and-ratchet mechanism near the end of the second cycle, moves downwardly to its starting position even if the operator still holds the treadle depressed.

In order to cause the wipers 144 to press more firmly on the margin of the upper as they wipe it inwardly over the insole in the second cycle of operations than in the first cycle, the cam 43 acts, substantially at the end of the first cycle, through the lever 51 and the links 55 to turn the internally threaded bushings 63 in such directions as to increase the effective lengths of the links 68 (Figs. 2 and 6). In this manner the slides 69 which carry the crosshead 66 and the holddown 82 are moved upward slightly to lift the holddown, thus causing the shoe to be correspondingly lifted by the previously mentioned pawl-and-ratchet mechanism which controls the toe rest preparatory to the wiping of the margin of the upper inwardly in the second cycle of operations.

The third cam 47 is arranged to move the downwardly extending arm 127 of the hand lever 129 (Figs. 1 and 5) forwardly at such an early time in the first cycle of operations as to insure that no tacks will be separated or driven in that cycle. Early in the second cycle of operations the arm 127 is moved rearwardly to such a position by the cam as to permit the separation and driving of tacks in that cycle. The construction is, however, such that after the machine has come automatically to a stop in the second cycle to permit the operator to inspect the work before the tacks are driven, he may then move the hand lever into position to prevent driving of tacks in that cycle, so that the upper will still be left in an unfastened condition. Such movement of the hand lever by the operator is permitted by reason of the fact that the portion of the cam track 117 (Fig. 5) in which the cam roll 119 lies when the machine is brought to a stop in the second cycle of operations is widened sufficiently to permit a corresponding movement of the cam roll.

The machine is further so constructed that when it is set to perform only one cycle of operations the hand lever 129 is disconnected from the link 123, so that the operator may, if desired, move the hand lever into position to prevent separation and driving of tacks without moving this link and the lever 121. For this purpose the front end portion of the link 123, which is provided forwardly of the pin 125 with an arcuate upper face 205 (Fig. 5), is pivotally connected to the upper end of a link 207 which is pivotally connected at its lower end to an eccentric pin 209 formed on the left-hand end of a rod 211 extending widthwise of the machine. This rod is provided at its right-hand end with a spiral gear 215 (Figs. 8 and 10) which is in mesh with a spiral gear 217 fast on the previously mentioned rod 31. When this rod, therefore, is turned by the knob 35 to such a position as to disconnect the shaft 7 from the gear 5, it turns the rod 211 to such a position that the link 123 is swung downwardly far enough to disconnect its slotted front end from the pin 125. This permits movement of the hand lever 129 relatively to the link 123 to prevent separation and driving of tacks, in response to which movement the pin 125 is swung forwardly along the arcuate face 205 of the link. Under these conditions the rod 31 cannot be turned by the knob 35 into position to connect the shaft 7 to the gear 5 by reason of engagement of the face 205 with the pin 125. That is, if it is desired to set the machine to perform two cycles of operations after the operator has moved the lever 129 into position to prevent separation and driving of tacks, he must first return the lever to the position in which the pin 125 is immediately above the slot in the link 123. Thereafter the turning of the rod 31 to set the machine to perform two cycles of operations serves to connect the link 123 to the lever 129. In order to prevent any undue movement of the lever 121 when the cam 47 is in its normal starting position with the cam roll 119 in the widened portion of the cam track 117, a stud 216 on which the roll is mounted is extended in such manner as to abut at that time against a lug 219 formed on the cam 45 (Fig. 4).

Whether a shoe has been operated upon by only one cycle or by two successive cycles of operations of the machine, it may happen, as hereinbefore suggested, that because of improper tacking it becomes necessary to cause the machine to operate once more on the shoe for the purpose only of driving another set of tacks. In that case, the operator assures himself that the machine is set to perform only one cycle of operations and also swings the rod 167 (Fig. 3) downwardly to the position where it is held by the latch arm 185. This serves, as hereinbefore described, to disconnect the parts of the links 135, as a result of which the upper-spreading fingers 142 (Fig. 15) are swung upwardly from their normal starting positions, and also serves to disconnect the rod 167 from the bell-crank lever 173 through which the holddown plate 174 is operated. Accordingly, as the machine performs its cycle of operations the upper-spreading fingers 142, although receiving their usual movements lengthwise and widthwise of the shoe, are maintained at such a height that they do not engage the shoe and therefore interference between the fingers and the previously tacked-down margin of the upper is avoided. The holddown plate 174 also remains in its initial position without being moved downwardly into engagement with the shoe. In the course of the operation of the machine the rod 167 frees itself from the latch arm 185 to permit it to resume its normal position preparatory to the operation of the machine on the next shoe. This serves to release the member 143 of the links 135 to the action of the springs 145. Return of the members 143 downwardly into positions where they again interlock with the members 137 is effected by imparting downward swinging movement to the bar 131 which carries the fingers 142. As disclosed in Letters Patent No. 2,134,148, the tackers 113 are controlled by tacker-alining plates 221 (Fig. 15), corresponding to the plates 283 of said Letters Patent, for positioning the lower ends of the tackers at proper distances inwardly from the edges of the wipers preparatory to the driving of the tacks. These plates are moved downwardly toward the shoe with the tackers at the proper time by a carrier 223 which supports them. For imparting the above-described downward swinging movement to the bar 131 the carrier 223 is provided with a screw 225 arranged to engage the top face of the bar. It will be understood that during the normal operation of the machine the upwardly extending finger 165 of the rod 167 imparts no movement to the lever 163, and also that the pin-and-slot connections 157 between the two rods 155 and the lever 159 permit the normal rearward and forward swinging movements of the links 135 resulting from the rearward and forward movements of the bar 131.

Having described the invention, what I claim as new and desire to secure by Letters Patent of the United States is:

1. In a shoe machine, the combination with means for operating on a shoe in a cycle of power operations of the machine, of means movable by the operator to start the machine, and additional means movable at the will of the operator prior to the starting of the machine to cause the machine to perform one cycle of operations and to begin a second cycle in response to one movement of said starting means.

2. In a shoe machine, the combination with means for operating on a shoe in a cycle of power operations of the machine, of means movable by the operator to start the machine, automatic means for normally bringing the machine to a stop at the end of the cycle, and additional means movable at the will of the operator for alternatively preventing the stopping of the machine by said automatic means until after the machine has begun a second cycle of operations.

3. In a shoe machine, the combination with means for operating on a shoe in a cycle of power operations of the machine, of automatic means for normally bringing the machine to a stop at the end of the cycle, and power-operated controlling mechanism for alternatively preventing automatically the stopping of the machine at the end of the cycle and for thereby causing the machine to begin a second cycle of operations after the first cycle.

4. In a shoe machine, the combination with means for operating on a shoe in a cycle of power operations of the machine, of automatic means for normally bringing the machine to a stop at the end of the cycle, power-operated controlling mechanism movable in the course of a cycle of operations to prevent alternatively the stopping of the machine at the end of the cycle and thereby to cause the machine to begin automatically a second cycle of operations after the first cycle, and means movable at the will of the operator to render said controlling mechanism either effective or ineffective to cause the machine thus to begin a second cycle of operations.

5. In a shoe machine, the combination with means for operating on a shoe in a cycle of power operations of the machine, of automatic means for normally bringing the machine to a stop at the end of the cycle, power-operated controlling mechanism movable in the course of a cycle of operations to prevent alternatively the stopping of the machine at the end of the cycle and thereby to cause the machine to begin automatically a second cycle of operations after the first cycle, and means movable at the will of the operator prior to the first cycle to cause said power-operated controlling mechanism either to be thus operated or to remain idle.

6. In a shoe machine, the combination with means for operating on a shoe in a cycle of power operations of the machine, of automatic means for normally bringing the machine to a stop at the end of the cycle, power-operated controlling mechanism movable in the course of a cycle of operations to prevent alternatively the stopping of the machine at the end of the cycle and thereby to cause the machine to begin automatically a second cycle of operations after the first cycle, a clutch through which said controlling mechanism is thus operated, and means for selectively controlling said clutch to cause said controlling mechanism either to be thus operated or to remain idle.

7. In a shoe machine, the combination with means for operating on a shoe in a cycle of power operations of the machine, of a clutch through which said means is operated, automatic means for normally controlling said clutch to bring the machine to a stop at the end of the cycle, and power-operated mechanism for alternatively preventing the stopping of the machine by said automatic means and for thereby causing the machine automatically to begin a second cycle of operations after the first cycle.

8. In a shoe machine, the combination with means for operating on a shoe in a cycle of power operations of the machine, of a clutch through which said means is operated, automatic means for normally controlling said clutch to bring the machine to a stop at the end of the cycle, power-operated mechanism movable in the course of a cycle of operations to prevent alternatively the stopping of the machine by said automatic means and thereby to cause the machine to begin a second cycle of operations after the first cycle, and means movable at the will of the operator to render said power-operated mechanism either effective or ineffective to cause the machine thus to begin a second cycle of operations.

9. In a shoe machine, the combination with means for operating on a shoe in a cycle of power operations of the machine, of a clutch through which said means is operated, automatic means for normally controlling said clutch to bring the machine to a stop at the end of the cycle, power-operated mechanism including a cam movable in the course of a cycle of operations to prevent alternatively the stopping of the machine by said automatic means and thereby to cause the machine to begin a second cycle of operations after the first cycle, and means movable at the will of the operator prior to the first cycle to cause said cam either to be thus operated or to remain idle.

10. In a shoe machine, the combination with means for operating on a shoe in a cycle of power operations of the machine, of a clutch through which said means is operated, automatic means for normally controlling said clutch to bring the machine to a stop at the end of the cycle, power-operated mechanism movable in the course of a cycle of operations to prevent alternatively the stopping of the machine by said automatic means and thereby to cause the machine to begin a second cycle of operations after the first cycle, a second clutch through which said power-operated mechanism is thus operated from the first-named clutch, and means for selectively controlling said second clutch to cause said power-operated mechanism either to be thus operated or to remain idle.

11. In a shoe machine, the combination with means for operating on a shoe in a cycle of power operations of the machine, of automatic means for normally bringing the machine to a stop between the beginning and the end of the cycle and again at the end of the cycle, and additional automatic means for alternatively preventing the machine from thus being brought to a stop until after it has begun a second cycle of operations following the first cycle.

12. In a shoe machine, the combination with means for operating on a shoe in a cycle of power operations of the machine, of automatic means for normally bringing the machine to a stop between the beginning and the end of the cycle and again at the end of the cycle, power-operated mechanism movable in the course of a cycle of operations for alternatively preventing the machine from thus being brought to a stop until after it has begun a second cycle of operations following the first cycle, and means movable at the will of the operator to render said power-operated mechanism either effective or ineffective thus to prevent the stopping of the machine.

13. In a shoe machine, the combination with means for operating on a shoe in a cycle of power operations of the machine, of automatic means for normally bringing the machine to a stop between the beginning and the end of the cycle and again at the end of the cycle, power-operated mechanism movable in the course of a cycle of operations for alternatively preventing the machine from thus being brought to a stop until after it has begun a second cycle of operations following the first cycle, and means movable at the will of the operator prior to the first cycle to cause said power-operated mechanism either to be thus operated or to remain idle.

14. In a shoe machine, the combination with means for wiping the margin of an upper inwardly over an insole on a last in a cycle of power operations of the machine, of automatic means for normally bringing the machine to a stop at a point in the cycle when the margin of the upper has been wiped inwardly to permit inspection of the work and again at the end of the cycle, and additional automatic means for alternatively preventing the machine from thus being brought to a stop until after it has begun a second cycle of operations and has arrived at the above-mentioned point in the second cycle.

15. In a shoe machine, the combination with means for wiping the margin of an upper inwardly over an insole on a last in a cycle of power operations of the machine, of automatic means for normally bringing the machine to a stop at a point in the cycle when the margin of the upper has been wiped inwardly to permit inspection of the work and again at the end of the cycle, power-operated mechanism movable in the course of a cycle of operations for alternatively preventing the machine from thus being brought to a stop until after it has begun a second cycle of operations and has arrived at the above-mentioned point in the second cycle, and means movable at the will of the operator to render said power-operated mechanism either effective or ineffective thus to prevent the stopping of the machine.

16. In a shoe machine, the combination with means for wiping the margin of an upper inwardly over an insole on a last in a cycle of power operations of the machine, of means for selectively causing the machine to run through a single cycle or through two cycles in operating on the same shoe, and mechanism for automatically changing the relation between the shoe and the wiping means when the machine runs through two cycles to cause the wiping means to apply greater pressure to the margin of the upper in the second cycle than in the first cycle.

17. In a shoe machine, the combination with means for wiping the margin of an upper inwardly over an insole on a last in a cycle of power operations of the machine, of automatic means for normally bringing the machine to a stop at the end of the cycle, additional automatic means for alternatively preventing the machine from thus being brought to a stop and for thereby causing the machine to begin a second cycle of operations after the first cycle, and mechanism for automatically changing the relation between the shoe and the wiping means when the machine thus performs two cycles of operations to cause the wiping means to apply greater pressure to the margin of the upper in the second cycle than in the first cycle.

18. In a shoe machine, the combination with means for wiping the margin of an upper inwardly over an insole on a last in a cycle of power operations of the machine, of automatic means for normally bringing the machine to a stop at the end of the cycle, power-operated controlling mechanism for alternatively preventing automatically the stopping of the machine at the end of the cycle and for thereby causing the machine to begin a second cycle of operations after the first cycle, and additional power-operated mechanism movable after the operation of the wiping means on the upper in the first cycle of operations to change the relation between the shoe and the wiping means and thereby to cause the wiping means to apply greater pressure to the margin of the upper in the second cycle than in the first cycle.

19. In a shoe machine, the combination with means for wiping the margin of an upper inwardly over an insole on a last in a cycle of power operations of the machine, of a holddown for engaging the bottom of the shoe to determine the position of the shoe heightwise relatively to said wiping means, automatic means for normally bringing the machine to a stop at the end of the cycle, power-operated controlling mechanism for alternatively preventing automatically the stopping of the machine at the end of the cycle and for thereby causing the machine to begin a second cycle of operations after the first cycle, and additional power-operated mechanism for moving said holddown to change the relation of the shoe to the wiping means and thereby to cause the wiping means to apply greater pressure to the margin of the upper in the second cycle than in the first cycle.

20. In a shoe machine, the combination with means for operating on a shoe in a cycle of power operations of the machine, of a device movable into position to control the shoe, a member for thus moving said device, automatic means for interrupting the operative relation between the device and said member in the course of the cycle of operations to permit the device to be returned to its initial position near the end of the cycle if said member has not been returned, means for selectively causing the machine to run through a single cycle or through two cycles in operating on the same shoe, and mechanism for automatically preventing such interruption of the operative relation between the shoe-controlling device and said member in the first cycle of operations when the machine runs through two cycles.

21. In a shoe machine, the combination with means for lasting the toe end of a shoe in a cycle of power operations of the machine, of a toe rest movable into position to control the shoe in the lasting operation, a treadle for thus moving said toe rest, automatic means for normally disconnecting the treadle from the toe rest in the course of the cycle of operations to permit the toe rest to be returned to its initial position near the end of the cycle if the treadle is still held depressed, means for selectively causing the machine to run through a single cycle or through two cycles in operating on the same shoe, and mechanism for automatically preventing such disconnection of the treadle from the toe rest in the first cycle of operations when the machine runs through two cycles.

22. In a shoe machine, the combination with means for lasting the toe end of a shoe in a cycle of power operations of the machine, of a toe rest movable into position to control the shoe in the lasting operation, a treadle for thus moving said toe rest, automatic means for normally disconnecting the treadle from the toe rest in the course of the cycle of operations to permit the toe rest to be returned to its initial position near the end of the cycle if the treadle is still held depressed, automatic means for normally bringing the machine to a stop at the end of the cycle, power-operated controlling mechanism movable in the course of a cycle of operations to prevent alternatively the stopping of the machine at the end of the cycle and thereby to cause the machine to begin a second cycle of operations after the first cycle, and additional power-operated mechanism for automatically preventing the disconnection of the treadle from the toe rest in the first cycle when the machine thus performs two cycles of operations.

23. In a shoe machine, the combination with means for lasting the toe end of a shoe in a cycle of power operations of the machine, of a toe rest movable into position to control the shoe in the lasting operation, a treadle for thus moving said toe rest, automatic means for normally disconnecting the treadle from the toe rest in the course of the cycle of operations to permit the toe rest to be returned to its initial position near the end of the cycle if the treadle is still held depressed, automatic means for normally bringing the machine to a stop at the end of the cycle, power-operated controlling mechanism movable in the course of a cycle of operations to prevent alternatively the stopping of the machine at the end of the cycle and thereby to cause the machine to begin a second cycle of operations after the first cycle, a clutch through which said controlling mechanism is thus operated at the will of the operator, and additional mechanism arranged to be operated through said clutch for automatically preventing the disconnection of the treadle from the toe rest in the first cycle when the machine thus performs two cycles of operations.

24. In a shoe machine, the combination with means for shaping an upper over a last and means for inserting fastenings to fasten the upper in a cycle of power operations of the machine, of means for selectively causing the machine to run through a single cycle or through two cycles in operating on the same shoe, and mechanism for automatically preventing the insertion of fastenings in the first cycle only when the machine runs through two cycles.

25. In a shoe machine, the combination with means for shaping an upper over a last and means for inserting fastenings to fasten the upper in a cycle of power operations of the machine, of automatic means for normally bringing the machine to a stop at the end of the cycle, power-operated controlling mechanism movable in the course of a cycle of operations to prevent alternatively the stopping of the machine at the end of the cycle and thereby to cause the machine to begin a second cycle of operations after the first cycle, and additional power-operated mechanism for automatically preventing the insertion of fastenings in the first cycle only when the machine thus performs two cycles of operations.

26. In a shoe machine, the combination with means for shaping an upper over a last and means for inserting fastenings to fasten the upper in a cycle of power operations of the machine, of automatic means for normally bringing the machine to a stop at the end of the cycle, power-operated controlling mechanism movable in the course of a cycle of operations to prevent alternatively the stopping of the machine at the end of the cycle and thereby to cause the machine to begin a second cycle of operations after the first cycle, a clutch through which said controlling mechanism is thus operated at the will of the operator, and additional mechanism arranged to be operated through said clutch for automatically preventing the insertion of fastenings in the first cycle only when the machine thus performs two cycles of operations.

27. In a shoe machine, the combination with means for shaping an upper over a last and means for inserting fastenings to fasten the upper in a cycle of power operations of the machine, of automatic means for normally bringing the machine to a stop at the end of the cycle, power-operated controlling mechanism movable in the course of a cycle of operations to prevent alternatively the stopping of the machine at the end of the cycle and thereby to cause the machine to begin a second cycle of operations after the first cycle, additional power-operated mechanism movable automatically to prevent the insertion of fastenings in the first cycle only when the machine thus performs two cycles of operations, and means movable at the will of the operator prior to the first cycle to cause both said power-operated mechanisms either to be thus operated or to remain idle.

28. In a shoe machine, the combination with means for shaping an upper over a last and means for inserting fastenings to fasten the upper in a cycle of power operations of the machine, of means for selectively causing the machine to run through a single cycle or through two cycles in operating on the same shoe, and mechanism for preventing the insertion of fastenings in the first cycle but movable automatically to permit their insertion in the second cycle when the machine runs through two cycles, said mechanism being movable at the will of the operator to prevent alternatively the insertion of fastenings also in the second cycle.

29. In a shoe machine, the combination with means for shaping an upper over a last and means for inserting fastenings to fasten the upper in a cycle of power operations of the machine, of means for selectively causing the machine to run through a single cycle or through two cycles in operating on the same shoe, power-operated mechanism for preventing the insertion of fastenings in the first cycle but movable to permit their insertion in the second cycle when the machine runs through two cycles, and a cam for operating said mechanism, said cam being so formed as to permit the operator alternatively to move said mechanism into position to prevent the insertion of fastenings also in the second cycle.

30. In a shoe machine, the combination with means for shaping an upper over a last and means for inserting fastenings to fasten the upper in a cycle of power operations of the machine, of controlling means movable selectively either into position to cause the machine to run through a single cycle or into position to cause it also automatically to begin a second cycle in operating on the same shoe, mechanism movable by the operator at will to prevent the insertion of fastenings during the cycle when the machine runs through a single cycle, power-operated mechanism for operating said first-named mechanism to prevent the insertion of fastenings in the first cycle when the machine runs through two cycles, and means for operatively connecting said two mechanisms by the movement of said controlling means into position to cause the machine also to begin a second cycle.

31. In a shoe machine, the combination with means for shaping an upper over a last and means for inserting fastenings to fasten the upper in a cycle of power operations of the machine, of controlling means movable selectively either into position to cause the machine to run through a single cycle or into position to cause it also to begin automatically a second cycle in operating on the same shoe, mechanism movable by the operator at will into position to prevent the insertion of fastenings during the cycle when the machine runs through a single cycle, and means for preventing movement of said controlling means into position to cause the machine also to begin a second cycle when said mechanism is in position to prevent the insertion of fastenings.

32. In a shoe machine, the combination with wipers for wiping the margin of an end of an upper inwardly over an insole on a last and means for inserting fastenings to fasten the upper in a cycle of power operations of the machine, of means for selectively causing the machine to run through a single cycle or through two cycles in operating on the same shoe, and mechanism for preventing the insertion of fastenings in the first cycle but movable automatically to permit their insertion in the second cycle when the machine runs through two cycles.

33. In a shoe machine, the combination with wipers for wiping the margin of an end of an upper inwardly over an insole on a last and means for inserting fastenings to fasten the upper in a cycle of power operations of the machine, of means for selectively causing the machine to run through a single cycle or through two cycles in operating on the same shoe, and power-operated mechanism movable automatically in the first cycle to prevent the insertion of fastenings in that cycle and further movable automatically to permit their insertion in the second cycle when the machine runs through two cycles.

34. In a shoe machine, the combination with wipers for wiping the margin of the toe end of an upper inwardly over an insole on a last and means for inserting fastenings to fasten the upper in a cycle of power operations of the machine, of upper-spreading means movable along the bottom of the insole outwardly toward the edge of the insole in the course of the cycle of operations, said upper-spreading means being movable at the will of the operator to such a position heightwise of the shoe as to prevent any substantial interference between it and the shoe in its movement along the shoe bottom if the machine is operated to insert fastenings in a previously lasted shoe.

35. In a shoe machine, the combination with wipers for wiping the margin of the toe end of an upper inwardly over an insole on a last and means for inserting fastenings to fasten the upper in a cycle of power operations of the machine, of upper-spreading means movable along the bottom of the insole outwardly toward the edge of the insole in the course of the cycle of operations, and mechanism for moiving said upper-spreading means at the will of the operator prior to the starting of the cycle of operations to such a position as to prevent any substantial interference between it and the shoe if the machine is operated to insert fastenings in a previously lasted shoe.

36. In a shoe machine, the combination with wipers for wiping the margin of the toe end of an upper inwardly over an insole on a last in a cycle of power operations of the machine, of upper-spreading means movable along the bottom of the insole outwardly toward the edge of the insole in the course of the cycle of operations, said upper-spreading means being movable at the will of the operator into position to prevent its engagement with a shoe during the cycle.

37. In a shoe machine, the combination with wipers for wiping the margin of the toe end of an upper inwardly over an insole on a last in a cycle of power operations of the machine, of upper-spreading means movable along the bottom of the insole outwardly toward the edge of the insole in the course of the cycle of operations, mechanism for moving said upper-spreading means at the will of the operator to an abnormal position to render it ineffective during the cycle, and automatic means for returning said upper-spreading means to its normal position.

38. In a shoe machine, the combination with wipers for wiping the margin of the toe end of an upper inwardly over an insole on a last in a cycle of power operations of the machine, of upper-spreading means movable along the bottom of the insole outwardly toward the edge of the insole in the course of the cycle of operations, and connections for moving said upper-spreading means heightwise of the shoe in the course of the cycle, said connections being extensible at the will of the operator to position the upper-spreading means at an abnormal distance from the bottom of the shoe as it is moved outwardly along the insole, and automatic means for restoring said connections to their original condition prior to the end of the cycle.

39. In a shoe machine, the combination with wipers for wiping the margin of the toe end of an upper inwardly over an insole on a last in a cycle of power operations of the machine, of upper-spreading means movable along the bottom of the insole outwardly toward the edge of the insole in the course of the cycle of operations, mechanism including links arranged to extend heightwise of the shoe for positioning said upper-spreading means relatively to the bottom of the shoe, said links comprising parts normally connected together but arranged to be disconnected at the will of the operator, spring means for effecting relative movements of the parts of said links to position the upper-spreading means at an abnormal distance from the bottom of the shoe as it is moved outwardly along the insole when the parts of the links are thus disconnected, and automatic means for returning the upper-spreading means to its normal position and for again connecting the parts of the links together prior to the end of the cycle of operations.

40. In a shoe machine, the combination with wipers for wiping the margin of the toe end of an upper inwardly over an insole on a last in a cycle of power operations of the machine, of a member movable automatically in the cycle of operations into engagement with the margin of the toe end of the insole to press it on the bottom of the last, and means for alternatively rendering said member inoperative during the cycle at the will of the operator.

41. In a shoe machine, the combination with wipers for wiping the margin of the toe end of an upper inwardly over an insole on a last in a cycle of power operations of the machine, of a member arranged to engage the margin of the toe end of the insole to press it on the bottom of the last, and power-operated mechanism for moving said member into engagement with the insole in the course of the cycle of operations, said mechanism including parts relatively displaceable at the will of the operator by a single movement of one of them to render said member inoperative during the cycle.

WILLIAM THOMAS BUCKINGHAM ROBERTS.